United States Patent
Sokolofsky et al.

(10) Patent No.: US 10,654,338 B2
(45) Date of Patent: May 19, 2020

(54) AIR MIXING DAMPER ARRANGEMENT

(71) Applicant: MAHLE International GmbH, Stuttgart (DE)

(72) Inventors: Phillip Sokolofsky, Akron, NY (US); Martin Stucko, Elba, NY (US); Steve M. Zielinski, North Tonowanda, NY (US)

(73) Assignee: MAHLE International GmbH, Stuttgart (DE)

( * ) Notice: Subject to any disclaimer, the term of this patent is extended or adjusted under 35 U.S.C. 154(b) by 263 days.

(21) Appl. No.: 15/816,370

(22) Filed: Nov. 17, 2017

(65) Prior Publication Data

US 2019/0152290 A1 May 23, 2019

(51) Int. Cl.
*B60H 1/00* (2006.01)

(52) U.S. Cl.
CPC ..... *B60H 1/00857* (2013.01); *B60H 1/00678* (2013.01)

(58) Field of Classification Search
CPC .......................... B60H 1/00678; B60H 1/00857
See application file for complete search history.

(56) References Cited

U.S. PATENT DOCUMENTS

| | | | |
|---|---|---|---|
| 3,916,988 A | 11/1975 | Matsuda | |
| 4,069,724 A * | 1/1978 | Sobotta | F16H 25/16 74/54 |
| 5,647,399 A * | 7/1997 | Andersen | B60H 1/00842 137/637.3 |
| 6,484,755 B1 * | 11/2002 | Schwarz | B60H 1/00678 137/637.3 |
| 6,695,691 B1 * | 2/2004 | Le | B60H 1/00678 454/121 |
| 6,789,607 B1 * | 9/2004 | Jun | B60H 1/00678 165/203 |
| 8,398,468 B2 * | 3/2013 | Kim, II | B60H 1/00678 454/143 |
| 9,616,729 B2 | 4/2017 | Chiba et al. | |
| 10,279,652 B2 * | 5/2019 | Wagnitz | B60H 1/00678 |

(Continued)

FOREIGN PATENT DOCUMENTS

| DE | 103 22 457 A1 | 12/2004 |
|---|---|---|
| DE | 102004013686 A1 | 10/2005 |

(Continued)

*Primary Examiner* — Avinash A Savani
*Assistant Examiner* — Martha M Becton
(74) *Attorney, Agent, or Firm* — Muncy, Geissler, Olds & Lowe, P.C.

(57) ABSTRACT

An air mixing damper arrangement having a first cooled air damper damping cooled air in a cooled air flow path and a second heated air damper damping heated air in a heated air flow path, wherein the first damper has a first shaft having a first center of rotation and the second damper has a second shaft having a second center of rotation, wherein the first center of rotation and the second center of rotation are substantially identically aligned. The first damper and the second damper are individually rotatable about their respective center of rotation, wherein the first damper and the second damper are both actuated by a cam plate, the first damper has a lever having a pin having a top level shape and a bottom level shape, the second damper has a lever having a first pin and a second pin.

9 Claims, 11 Drawing Sheets

(56) References Cited

U.S. PATENT DOCUMENTS

| | | | | |
|---|---|---|---|---|
| 2009/0264061 A1* | 10/2009 | Kim, II | ............ | B60H 1/00678 |
| | | | | 454/143 |
| 2010/0009618 A1 | 1/2010 | Dieksander et al. | | |
| 2015/0044959 A1* | 2/2015 | Chikagawa | ........ | B60H 1/00521 |
| | | | | 454/152 |
| 2017/0028812 A1* | 2/2017 | Wiesmann | ......... | B60H 1/00857 |
| 2017/0282681 A1* | 10/2017 | Wagnitz | ............ | B60H 1/00678 |
| 2018/0010678 A1* | 1/2018 | Dubois | ............. | B60H 1/00857 |

FOREIGN PATENT DOCUMENTS

| | | | |
|---|---|---|---|
| FR | 2229568 | A1 | 12/1974 |
| FR | 2 763 286 | | 11/1998 |

* cited by examiner

AIR MIXING DAMPER ARRANGEMENT

BACKGROUND OF THE INVENTION

Field of the Invention

The invention relates to an air mixing damper arrangement, especially for an air-conditioning unit of a motor vehicle.

Description of the Background Art

Air-conditioning units typically comprise a housing in which at least one air flow path is provided. Furthermore such an air-conditioning unit comprises a blower unit for feeding air into the housing of the air-conditioning unit such that the air flows through the at least one air flow path. Within the air flow path typically an evaporator and a heater core is provided. The evaporator cools the air flow flowing through the evaporator and the heater core typically heats up the air flow flowing through the heater core.

To control the amount of heated and/or cooled air and the mixture of cooled and heated air, an air mixing damper arrangement is provided, which controls the amount of cooled air which passes the evaporator and enters the mixing chamber and which controls the amount of heated air which passes the heater core and enters the mixing chamber. After the cooled air has entered the mixing chamber and the heated air has entered the mixing chamber the cooled air and the heated air are mixed to an air flow of mixed temperature which leaves the air-conditioning unit through air vents.

Since the mixing damper arrangement typically comprises only one mixing damper at least one of the flow paths of cooled air flow or heated air flow is typically open to the mixing chamber such that cooled air or the heated air is permanently entering the mixing chamber and leaving the mixing chamber to the air vents. Therefore not only cooled air or heated air is provided but additionally noise is emitted to the passenger compartment through the air vents.

A possibility to reduce the noise level of the emitted noise is to close both the cooled air flow path to the mixing chamber and the heated air mixing chamber if the air mixing is not necessary in selected times of use. Therefore the cooled air flow path and the heated air flow path will be shut off in such times of use by means of two different dampers, a cold air damper and a heated air damper which individually close the respective cold air flow path and heated air flow path. Such a cold air damper is located in the cooled air flow path and the heated air damper is located in the heated air flow path such that both dampers are actuated by different actuators. Furthermore such dampers are typically located at different places within the housing of the air-conditioning unit. This leads to more space available for such dampers.

U.S. Pat. No. 9,616,729 B2 discloses two different dampers located in the cooled air flow path and in the heated air flow path while being actuated by only one actuator such that both dampers are actuated only in a fixed relationship to each other. Therefore they are typically actuated such that the cooled air flow path is opened while the heated air flow path will be closed and vice versa. There is no possibility to close both air flow paths independently.

SUMMARY OF THE INVENTION

It is therefore an object of the present invention to provide an air mixing damper arrangement which allows to close both the cooled air flow path and the heated air flow path at the same time. Furthermore it is the object of the invention to provide an air-conditioning unit which has such an air mixing damper arrangement. Furthermore it is an object of the invention to provide a method of controlling an air mixing damper arrangement which allows air mixing and furthermore additionally to close a cooled air flow path together with a heated air flow path if this is desired.

According to an embodiment of the invention an air mixing damper arrangement having a first cooled air damper damping cooled air in a cooled air flow path and a second heated air damper damping heated air in a heated air flow path, wherein the first damper has a first shaft having a first center of rotation and the second damper has a second shaft having a second center of rotation, wherein the first center of rotation and the second center of rotation are identically aligned, wherein the first damper and the second damper are individually rotatable about their respective center of rotation, wherein the first damper and the second damper are both actuated by a cam plate, the first damper has a lever having a pin having a top level shape and a bottom level shape, the second damper has a lever having a first pin and a second pin, wherein the first pin of the second damper has a shape cooperating with the bottom level shape of the pin of the first damper, wherein the cam plate has a first groove having a first top level tier and having a second bottom level tier and the cam having a second groove with one tier, the arrangement of the damper is such that the top level shape of the pin of the first damper is movable in the top level tier of the first groove, the bottom level shape of the pin of the first damper is movable in the bottom level tier of the first groove, the first pin of the second damper is movable in the bottom level tier of the first groove and the second pin of the second damper is movable in the second groove. Therefore the air mixing damper allows on the first hand side an actuation of a mixing damper where both the first damper and the second damper are actuated in common. Additionally the air mixing damper allows on the second hand side an actuation of a mixing damper where only the first damper is actuated while the second damper is e.g. at rest.

According to an embodiment of the invention it is of advantage that the top level tier of the first groove extends through the full actuation angle of the cam plate such that the top level shape of the pin of the first damper is always located within the top level tier of the first groove. Therefore the first damper is always actuatable provided that the cam is rotating and the first groove has an inclination related to the radius of the first groove.

According to an embodiment of the invention it is of advantage that the bottom level tier of the first groove extends only partly through the full actuation angle of the cam plate such that the bottom level shape of the first pin of the first damper is only partly located within the bottom level tier of the first groove and partly located out of the bottom level tier of the first groove with respect to the actuation angle of the cam plate. Therefore the bottom level shape of the pin of the first damper releases the first pin of the second damper such that both dampers may be actuated independently.

According to an embodiment of the invention it is of advantage that the bottom level tier of the first groove extends only partly through the full actuation angle of the cam plate such that the bottom level shape of the first pin of the second damper is only partly located within the bottom level tier of the first groove and partly located out of the bottom level tier of the first groove with respect to the actuation angle of the cam plate. Therefore the bottom level shape of the pin of the first damper releases the first pin of the second damper such that both dampers may be actuated independently.

According to an embodiment of the invention it is of advantage that the second groove extends only partly through the full actuation angle of the cam plate such that the second pin of the second damper is only partly located within the second groove and partly located out of the second groove with respect to the actuation angle of the cam plate. This allows to actuate the second damper independently from the actuation of the first damper, especially to keep the second damper at rest while the first damper will be actuated.

According to an embodiment of the invention it is of advantage that the first pin of the second damper undergoes a transition from a movement of the first pin within the first groove to a movement outside of the first groove or from a movement of the first pin outside of the first groove to within the first groove and the second pin of the second damper undergoes a transition from a movement of the second pin outside of the second groove to within the second groove and from a movement of the second pin within the second groove to a movement outside of the second groove, wherein the transitions for the first pin and the second pin happens at almost the same actuation angle of the cam plate. This allows a defined transition of the pins of the second damper from inside to outside a groove and from outside to inside a groove respectively such that the second damper is always under controlled conditions. This will be achieved having an overlap with respect to the angle of rotation of the cam plate such that always one of the two pins of the second damper is located within a groove.

According to an embodiment of the invention it is of advantage that the transition of a pin out of a groove happens before the transition the other pin inside the groove is already terminated, such that the first groove and the second groove are both developed at an actuation angle of the cam plate at which the transitions are taking place.

According to an embodiment of the invention it is of advantage that an actuator is provided which actuates the cam plate. The actuator is preferably an electric motor, a magnetic device, a hydraulic device and/or a pneumatic device.

According to an embodiment of the invention it is of advantage that the actuator rotates the cam plate such that the pins in the grooves actuate the first damper and/or the second damper. During a first phase of rotation both the first and the second dampers will be actuated while in a second phase of rotation only the first damper will be actuated. Therefore in the first phase the first damper and the second damper are actuated like a mixing damper opening the cooled air flow path while closing the heated air flow path or opening the heated air flow path while closing the cooled air flow path. In a second phase of rotation the heated air flow path will be closed starting from an open position while the cooled air flow path is kept closed.

According to an embodiment of the invention an air-conditioning unit is provided having an air mixing damper arrangement according at least one feature of the inventive embodiment or according to a described embodiment.

According to an embodiment of the invention a method of controlling an air mixing damper arrangement is provided having a first cooled air damper and a second heated air damper, wherein the first damper has a first shaft having a first center of rotation and the second damper has a second shaft having a second center of rotation, wherein the first center of rotation and the second center of rotation are identical, wherein the first damper and the second damper are individually rotatable about the respective center of rotation, wherein the first damper and the second damper are both actuated by a cam plate, the first damper has a lever having a pin having a top level shape and a bottom level shape, the second damper has a lever having a first pin and a second pin, wherein the first pin has a shape cooperating with the second level pin of the first damper, wherein the cam plate has a first groove having a first top level tier and having a second bottom level tier and the cam having a second groove with one tier, the arrangement of the damper is such that the top level shape of the pin of the first damper is movable in the top level tier of the first groove, the bottom level shape of the pin of the first damper is movable in the bottom level tier of the first groove, the first pin of the second damper is movable in the bottom level tier of the first groove and the second pin of the second damper is movable in the second groove, such that in a first angular range of rotation of the cam plate both the first damper and the second damper are actuated and in a second angular range of rotation of the cam plate only the first damper is actuated while the second damper is at least almost at rest.

According to an embodiment of the invention it is of advantage that the top level tier of the first groove extends through the full actuation angle of the cam plate of both the first angular range and the second angular range of rotation of the cam plate such that the top level shape of the first pin of the first damper is always located within the top level tier of the first groove.

According to an embodiment of the invention it is of advantage that the bottom level tier of the first groove extends only partly through the full actuation angle of the cam plate and through the first angular range of rotation of the cam plate such that the bottom level shape of the first pin of the first damper is only partly located within the bottom level tier of the first groove through the first angular range of rotation of the cam plate and partly located out of the bottom level tier of the first groove with respect to the actuation angle of the cam plate and through the second angular range of rotation of the cam plate.

According to an embodiment of the invention it is of advantage that the bottom level tier of the first groove extends only partly through the full actuation angle of the cam plate and through the first angular range of rotation of the cam plate such that the bottom level shape of the first pin of the second damper is only partly located within the bottom level tier of the first groove through the first angular range of rotation of the cam plate and partly located out of the bottom level tier of the first groove with respect to the actuation angle of the cam plate through the second angular range of rotation of the cam plate.

According to an embodiment of the invention it is of advantage that the second groove extends only partly through the full actuation angle of the cam plate through the second angular range of the cam plate such that the second pin of the second damper is only partly located within the second groove through the second angular range of the cam plate and partly located out of the second groove with respect to the actuation angle of the cam plate through the first angular range of the cam plate.

According to an embodiment of the invention it is of advantage that the first pin of the second damper undergoes a transition from a movement of the first pin within the first groove to a movement outside of the first groove or from a movement of the first pin outside of the first groove to within the first groove and the second pin of the second damper undergoes a transition from a movement of the second pin outside of the second groove to within the second groove and from a movement of the second pin within the second groove to a movement outside of the second groove, wherein the transitions for the first pin and the second pin happens at almost the same actuation angle of the cam plate at the transition from the first angular range of the cam plate to the second angular range of the cam plate.

According to an embodiment of the invention it is of advantage that the transition of a pin out of a groove happens before the transition the other pin inside the groove is already terminated, such that the first groove and the second groove are both developed at an actuation angle of the cam plate at which the transitions are taking place.

According to an embodiment of the invention it is of advantage that an actuator is provided actuating the cam plate through the first angular range of rotation and the second angular range of rotation.

According to an embodiment of the invention it is of advantage that the actuator rotates the cam plate such that the pins in the grooves actuate the first damper and/or the second damper.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
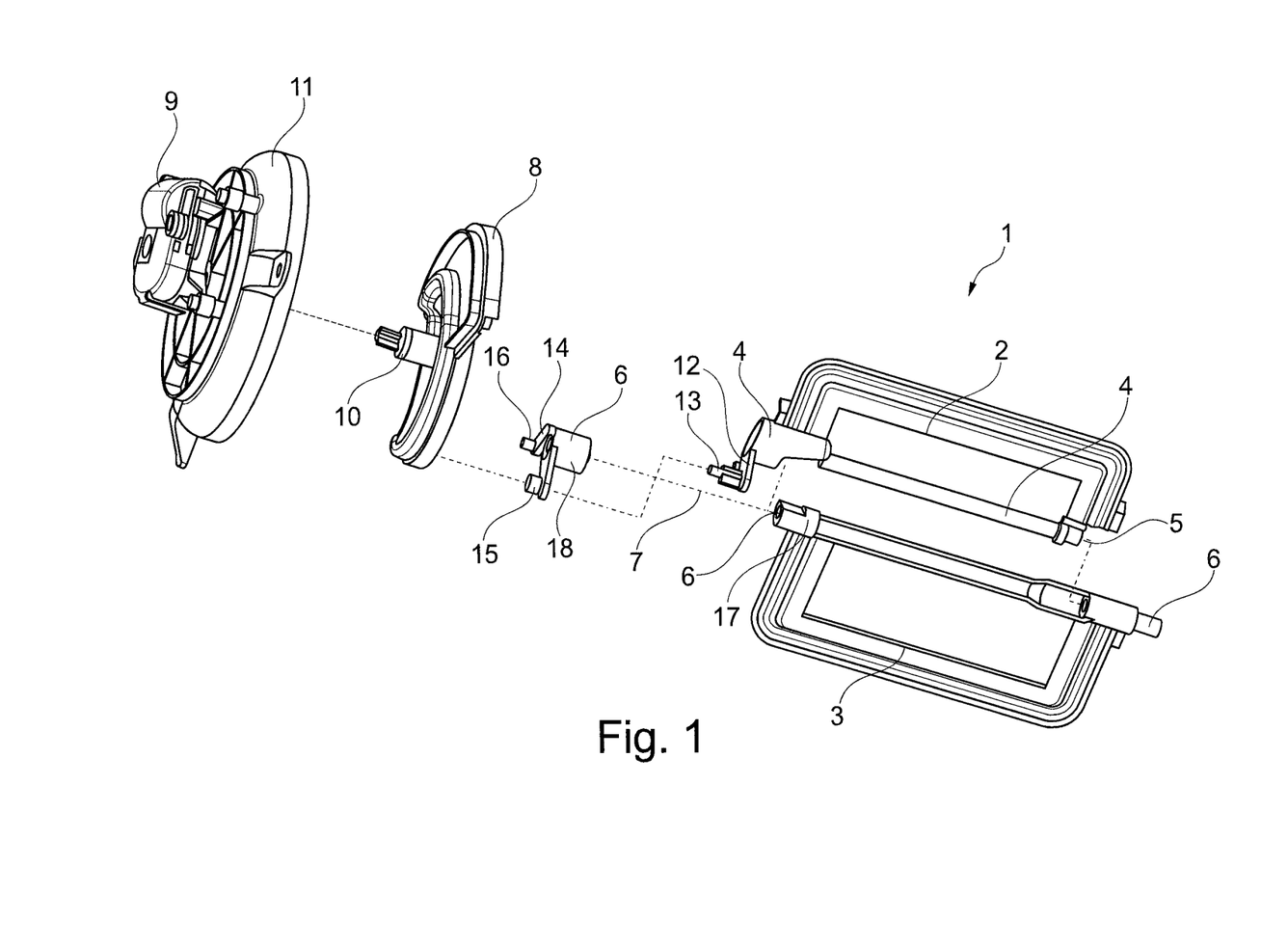
FIG. 1 shows a perspective, explosive view of an embodiment of an air mixing damper arrangement.

FIG. 1 shows a perspective, explosive view of an air mixing damper arrangement 1, especially of an air-conditioning unit 100 of a motor vehicle. The air-conditioning unit 100 has a cooled air flow path and a heated air flow path, wherein a cooling device, e.g. an evaporator, is located in the cooled air flow path to cool the air. Furthermore a heating device, e.g. a heater core, is located in the heated air flow path to heat up the air. The other figures show details of the air mixing damper arrangement 1.

The air mixing damper arrangement 1 has a first cooled air damper 2, called first damper, damping cooled air in a cooled air flow path and a second heated air damper 3, called second damper, damping heated air in a heated air flow path. In case the first damper 2 is fully closed and the second damper 3 is fully opened, heated air is feed to the mixing chamber of the air-conditioning unit 100. In case the first damper 2 is fully opened and the second damper 3 is fully closed, cooled air is feed to the mixing chamber of the air-conditioning unit 100. In case the first damper 2 is partly closed and the second damper 3 is partly opened, heated air and cooled air is feed to the mixing chamber of the air-conditioning unit 100.

The first damper 2 has a first shaft 4 having a first center of rotation 5 and the second damper 3 has a second shaft 6 having a second center of rotation 7, wherein the first center of rotation 5 and the second center of rotation 7 are identically aligned such that both dampers are rotating about the same axis.

Figure 7:
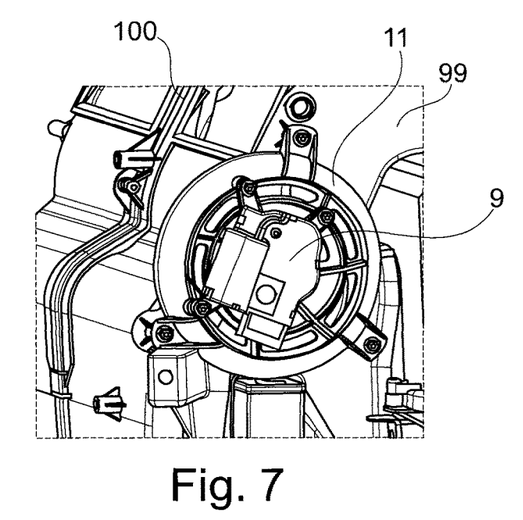
FIG. 7 shows a perspective view of a part of an air-conditioning unit with an actuator.

The two dampers 2, 3 are located adjacent to each other such that the first damper 2 and the second damper 3 are individually rotatable about their respective center of rotation 5, 7, wherein the first damper 2 and the second damper 3 are both actuated by a cam plate 8, which is actuated by an actuator 9, e.g. an electric motor. The cam plate 8 has a shaft 10, which is connected to the actuator 9 in a driving connection. The actuator is mounted to a cap 11, which covers the cam plate 8 and which is mounted on the housing 99 of the air-conditioning unit 100, see e.g. FIG. 7.

The first damper 2 has a lever 12 having a pin 13 which cooperates with the cam plate 8. The second damper 3 has a lever 14 having a first pin 15 and a second pin 16. The FIGS. 2 to 4 and 6 show details of the shafts 4, 6, the levers 12, 14 and of the pins 13, 15 and 16.

The shaft 6 is a two-part shaft comprising the part 17 and the part 18, which are to be connected. Therefore part 17 has cylindrical portion with at least one tooth and part 18 has a central cylindrical hole with at least one area for the location of the tooth of part 17 in order to generate a connection between part 17 and part 18 which transfers a torque. Shaft 4 is a hollow shaft in which part 17 and part 18 are inserted and connected to each other.

Figure 2:
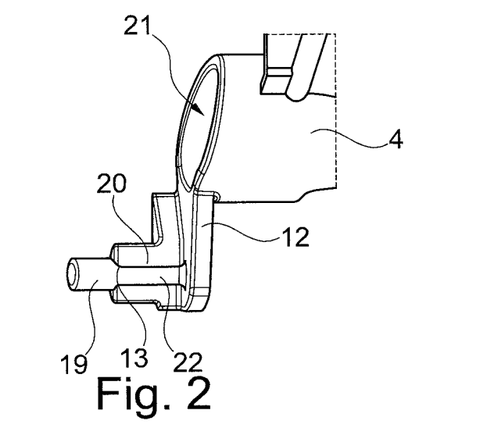
FIG. 2 shows a perspective view of a part of the shaft of the first damper.

FIG. 2 shows the shaft 4 and the lever 12 which is connected to the shaft 4. The lever 12 extends from the shaft 4 in a radial direction. The pin 13 is connected to the shaft 4 via the lever 12. As can be seen from FIG. 2, the pin 13 has a two level shape having a first level as a top level 19 and a second level as a bottom level 20. As can be seen from FIG. 2 is that the pin 13 at the top level 19 is made as a cylindrical pin whereas the pin 13 at the bottom level 20 is almost made as a semi cylindrical pin. The radius of the pin 13 at the top level 19 is smaller than the radius of the pin at the bottom level 20. At the bottom level 20 there is additionally a further structure of a cylinder 22 having a smaller radius than the radius of the bottom level shape and as the radius of the top level shape.

Shaft 4 is a hollow shaft in which part 17 and part 18 are inserted and connected to each other. The hollow shaft 4 has a central bore 21.

Figure 3:
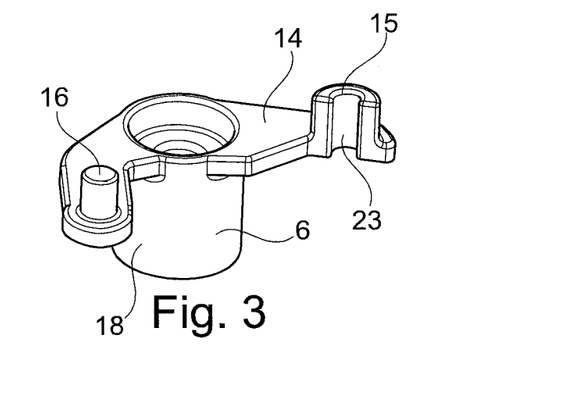
FIG. 3 shows a perspective view of a part of the shaft of the second damper.

FIG. 3 shows the shaft 6 with part 18 having a lever 14 with the pins 15 and 16. Pin 15 has the shape of a semi-cylinder which has cut a central bore 23. Therefore the shape of the bottom level of pin 13 and the shape of pin 15 are fitting to each other forming together a cylindrical shape. The pin 16 has the shape of a cylinder.

Figure 4:
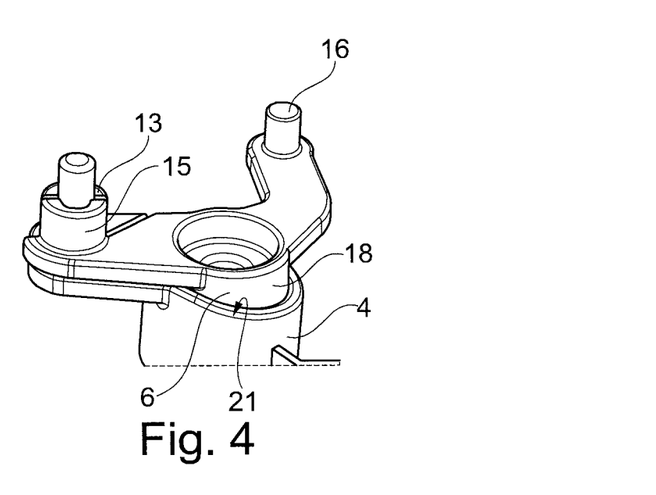
FIG. 4 shows a perspective view of a part of the shaft of the first damper and of the second damper.

FIG. 4 shows the insertion of part 18 of shaft 6 in the central bore 21 of shaft 4. The pins 13 and 15 are located adjacent to each other. The top level shape 19 of pin 13 is at a first level and the bottom level shape 20 of pin 13 and the pin 15 are at a second level. The cylinder 22 fits in the area 23 of pin 15.

Therefore the first damper 2 has lever 12 having a pin 13 with a top level shape 19 and a bottom level shape 20 and the second damper 3 has a lever 14 having a first pin 15 and a second pin 16, wherein the first pin 15 of the second damper 3 has a shape cooperating with the bottom level shape 20 of the pin 13 of the first damper 2.

Figure 5:
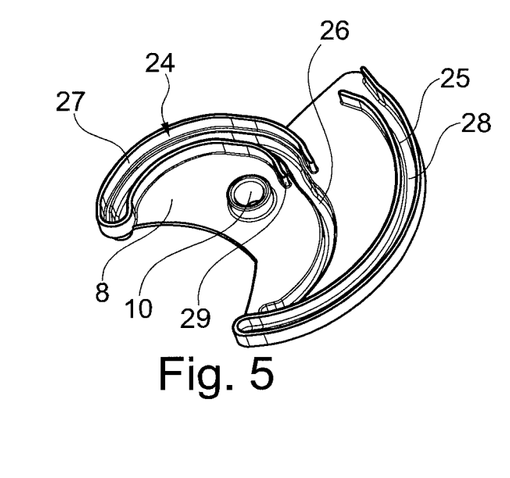
FIG. 5 shows a perspective view of a cam plate.

FIG. 5 shows a side view of the cam plate 8 showing a first groove 24 and a second groove 25. The grooves 24, 25 are extending in some angle of rotation of the cam plate having a defined radius, which might be changing or being stable over a certain degree the rotation of the cam plate 8. Typically the pin 13 and the pin 15 are controlled by groove 24 and pin 16 is controlled by groove 25 such that the pins 13, 15, 16 might reach into the grooves 24, 25 respectively.

The cam plate 8 is made such that the first groove 24 has a first top level tier 26 and a second bottom level tier 27 and the second groove 25 has only one tier 28.

Figure 6:
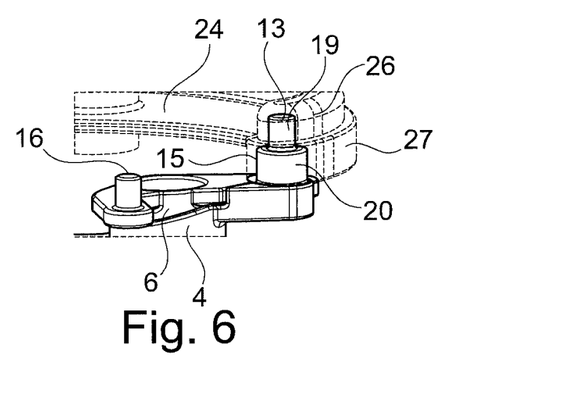
FIG. 6 shows a perspective view of a part of the shaft of the first damper; of the second damper and of the cam plate.
Figure 8:
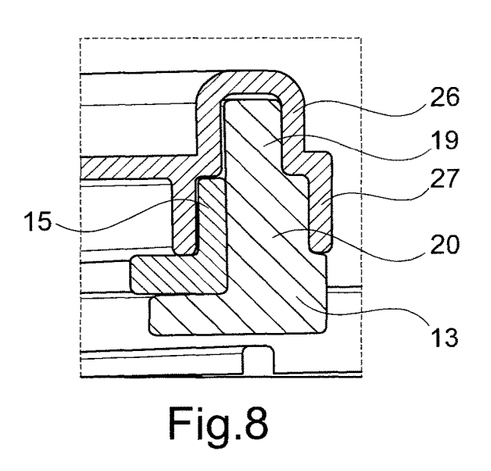
FIG. 8 shows a sectional view of a pin of the first damper and a pin of the second damper within a groove.
Figure 9:
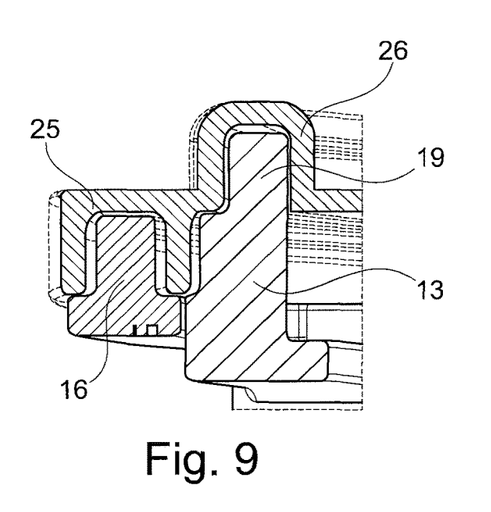
FIG. 9 shows a sectional view of a pin of the first damper within one groove and a pin of the second damper within another groove.
Figure 10:
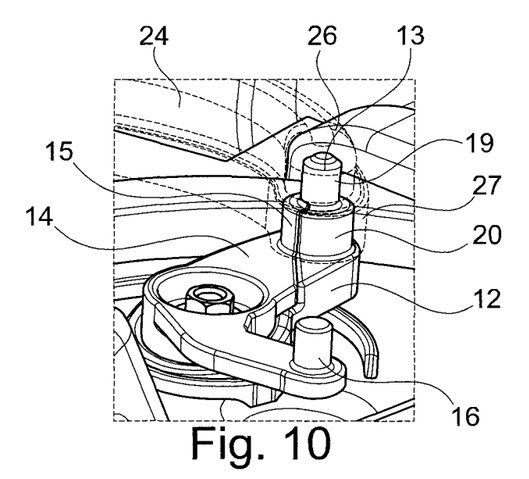
FIG. 10 shows an arrangement of levers, pins and grooves.

The arrangement of the damper 2, 3 is such that the top level shape 19 of the pin 13 of the first damper 2 is movable in the top level tier 26 of the first groove 24, the bottom level shape 20 of the pin 13 of the first damper 2 is movable in the bottom level tier 27 of the first groove 24, the first pin 15 of the second damper 3 is movable in the bottom level tier 27 of the first groove 24, what can be seen in FIGS. 6 and 10 and in FIGS. 8 and 9. The second pin 16 of the second damper 3 is movable in the second groove 25, see FIG. 9.

In case the cam plate 8 will be rotated by the actuator 9 the dampers 2, 3 will be actuated. The actuator 9 is provided to actuate the cam plate 8 and to control the actuation angle of the cam plate 8 i.e. the degree of rotation of the cam plate 8.

The grooves 24, 25 are made such that the top level tier 26 of the first groove 24 extends through the full actuation angle of the cam plate 8 such that the top level shape 19 of the first pin 13 of the first damper 2 is always located within the top level tier 26 of the first groove 24.

As can be seen from FIG. 5 the bottom level tier 27 of the first groove 24 extends only partly through the full actuation angle of the cam plate 8 such that the bottom level shape 20 of the first pin 13 of the first damper 2 is only partly located within the bottom level tier 27 of the first groove 24 and partly located outside of the bottom level tier 27 of the first groove 24 with respect to the actuation angle of the cam plate 8. The bottom level tier 27 has an end section 29 at which the bottom level tier 27 ends and at which the bottom level shape 20 moves out of the bottom level tier 27 being free for movements away from top level tier 26 as the actuation angle further increases.

As can be seen from FIG. 5 the bottom level tier 27 of the first groove 24 extends only partly through the full actuation angle of the cam plate 8 such that the bottom level shape of the first pin 15 or the first pin 15 at all of the second damper 3 is only partly located within the bottom level tier 27 of the first groove 24 and partly located out of the bottom level tier 27 of the first groove 24 with respect to the actuation angle of the cam plate 8. Within the bottom level tier 27 the bottom level shape 20 and the first pin 15 are located close to each other moving together through the bottom level tier 27 of groove 24. Outside the bottom level tier 27 of groove 24 the bottom level shape 20 and the pin 15 separate each other such that they do not longer move together as the actuation angle of the cam plate 8 increases.

Furthermore in FIG. 5 can be seen that the second groove 25 extends only partly through the full actuation angle of the cam plate 8 such that the second pin 16 of the second damper 3 is only partly located within the second groove 25 and partly located outside of the second groove 25 with respect to the actuation angle of the cam plate 8.

Therefore the first pin 15 of the second damper 3 undergoes a transition from a movement of the first pin 15 within the first groove 24 to a movement outside of the first groove 24 or from a movement of the first pin 15 outside of the first groove 24 to a movement within the first groove 24 and the second pin 16 of the second damper 3 undergoes a transition from a movement of the second pin 16 outside of the second groove 25 to a movement within the second groove 25 and from a movement of the second pin 16 within the second groove 25 to a movement outside of the second groove 25, wherein the transitions for the first pin 15 and the second pin 16 happens at almost the same actuation angle of the cam plate 8.

Figure 11:
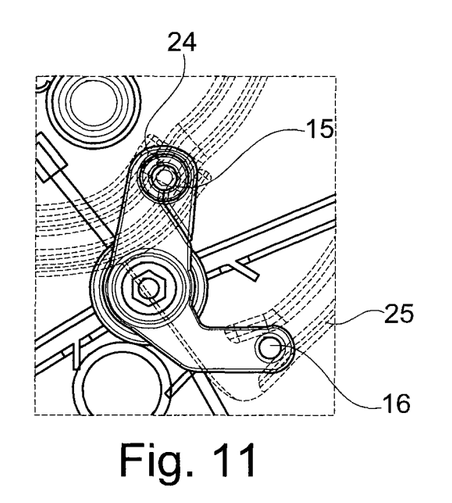
FIG. 11 shows an arrangement of levers, pins and grooves.

FIG. 11 shows the location of the pin 15 within the first groove 24 and the location of the second pin 16 within the second groove 25. The transition is shown since the first pin 15 moves out of the first groove 24 at further rotation of the cam plate 8 and the second pin 16 moves in the second groove 25 at further rotation of the cam plate 8. In order to have a stable transition there is an angular region of overlap such that the both pins 15 and 16 are at no angle of rotation both outside their respective grooves 24, 25. Pin 13 is located within groove 24.

Therefore the transition of a pin 15, 16 out of a groove 24, 25 happens after the transition of the other pin 16, 15 inside the respective groove 24, 25 is already terminated, such that the first groove 24 and the second groove 25 are both developed at an actuation angle of the cam plate 8 at which the transitions are taking place.

Figure 12:
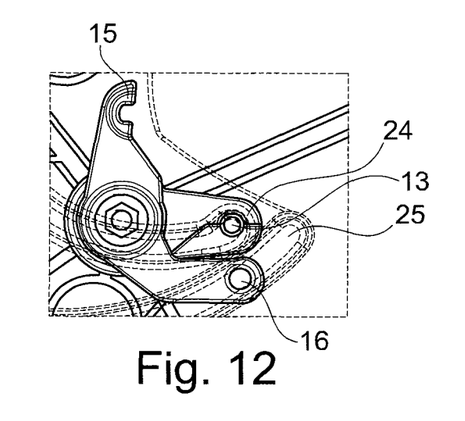
FIG. 12 shows an arrangement of levers, pins and grooves.

FIG. 12 shows a situation where pin 16 is within the groove 25 while pin 15 is located outside the groove 24. Pin 13 is still located within groove 24.

The actuator 9 rotates the cam plate 8 such that the pins 13, 15 and 16 in the grooves 24, 25 actuate the first damper 2 and/or the second damper 3.

Figure 13:
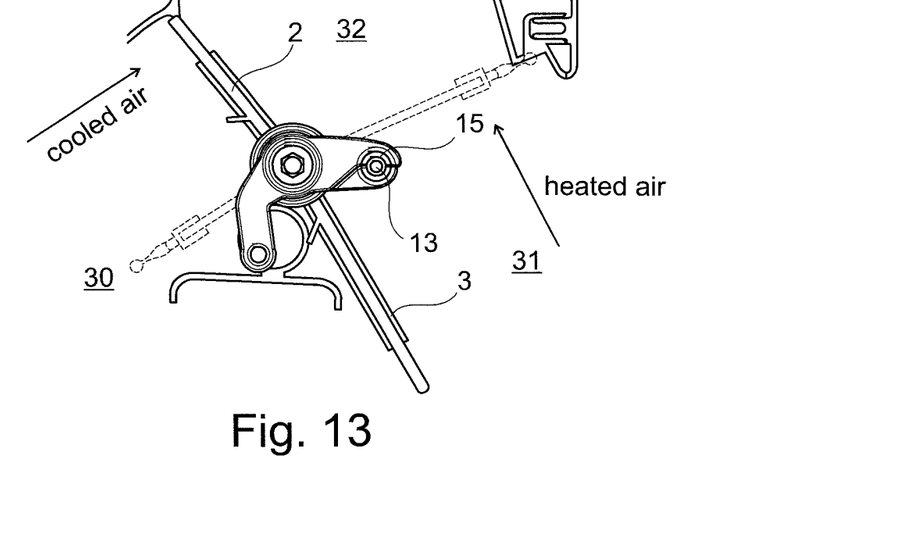
FIG. 13 shows an arrangement of the first damper and the second damper in a maximum hot condition.
Figure 14:
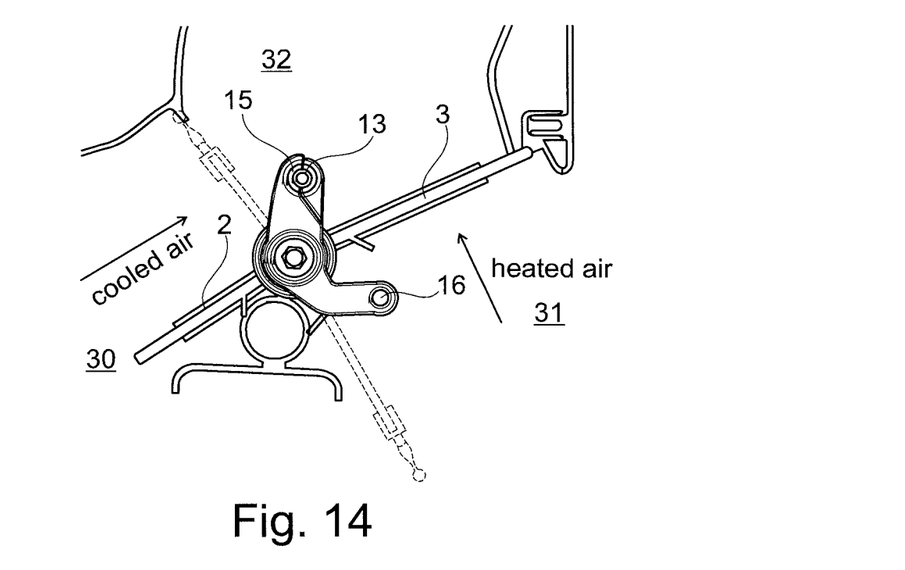
FIG. 14 shows an arrangement of the first damper and the second damper in a maximum cold condition.
Figure 15:
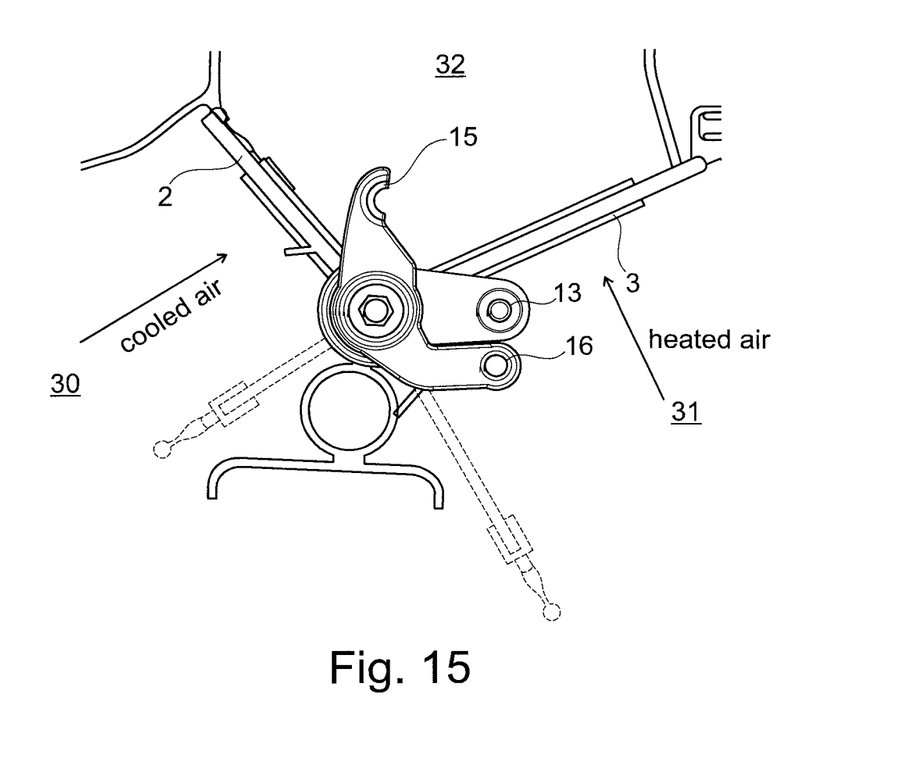
FIG. 15 shows an arrangement of the first damper and the second damper in an intermediate condition.

FIGS. 13 to 15 show the different positions of the first damper 2 and the second damper 3 with respect to the cooled air flow path 30 and the heated air flow path 31.

In FIG. 13 the dampers 2 and 3 are aligned almost in a linear configuration. The damper 2 and the damper 3 are located at almost an angle of 180°. The damper 2 closes the cooled air flow path 30 while the damper 3 opens the heated air flow path 31. Therefore heated air enters the mixing chamber 32 and cooled air is prevented from entering the mixing chamber 32.

In FIG. 14 the dampers 2 and 3 are aligned almost in a linear configuration. The damper 2 and the damper 3 are located at almost an angle of 180°. The damper 2 opens the cooled air flow path 30 while the damper 3 closes the heated air flow path 31. Therefore cooled air enters the mixing chamber 32 and heated air is prevented from entering the mixing chamber 32. The configuration of the dampers 2, 3 in FIG. 14 will be reached starting at the configuration of the dampers in FIG. 13 and turning the dampers 2, 3 counterclockwise by moving the pins 13 and 15 counterclockwise by means of the cam plate 8.

In FIG. 15 the dampers 2 and 3 are no longer aligned almost in a linear configuration but in an almost 90° configuration. The damper 2 and the damper 3 are located at almost an angle of 90°. The damper 2 closes the cooled air flow path 30 while the damper 3 closes the heated air flow path 31. Therefore cooled air is prevented from entering the mixing chamber 32 and heated air is prevented from entering the mixing chamber 32 too. The configuration of the dampers 2, 3 in FIG. 15 will be reached starting at the configuration of the dampers in FIG. 14 and turning the dampers 2 clockwise by moving the pin 13 while keeping the damper 3 at its position by keeping pin 16 at its position by means of the cam plate 8.

Figure 16:
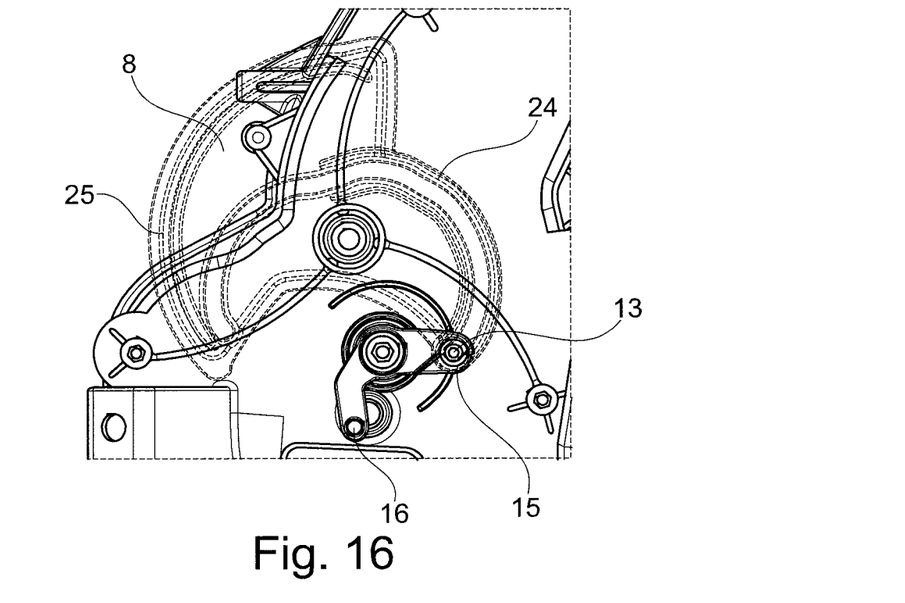
FIG. 16 shows an arrangement of the cam plate and the pins and levers according to FIG. 13.

The FIG. 16 shows the cam plate 8 in a position related to the position of the dampers 2, 3 according to FIG. 13. Both the pins 13 and 15 are located within groove 24 and the pin 16 is located outside groove 25.

Figure 17:
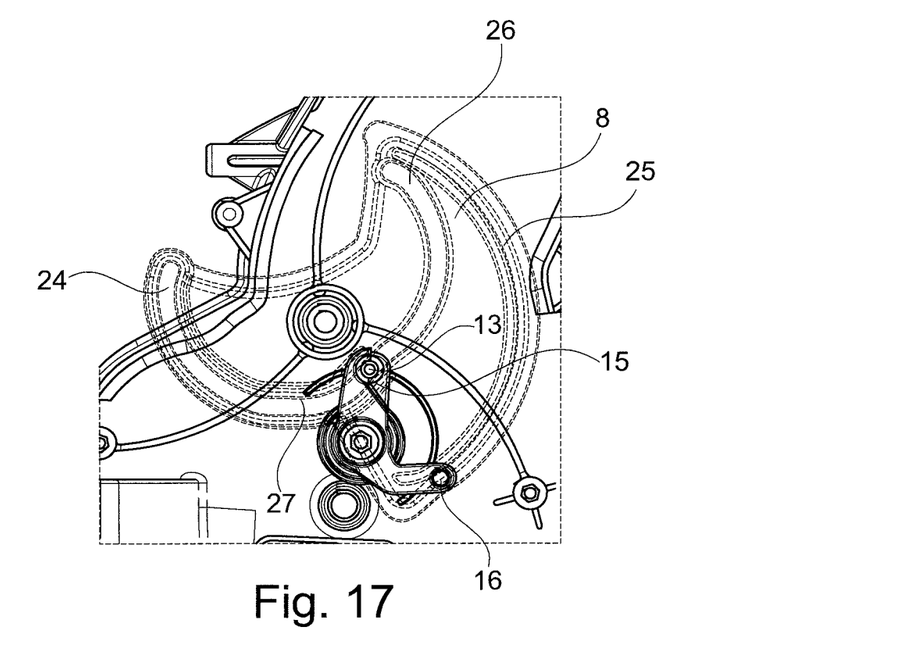
FIG. 17 shows an arrangement of the cam plate and the pins and levers according to FIG. 14.

The FIG. 17 shows the cam plate 8 in a position related to the position of the dampers 2, 3 according to FIG. 14. Both the pins 13 and 15 are located within groove 24 and the pin 16 is already located inside groove 25. After a further rotation of the cam plate 8 the pin 15 will move out of the groove 24 and 27 respectively.

Figure 18:
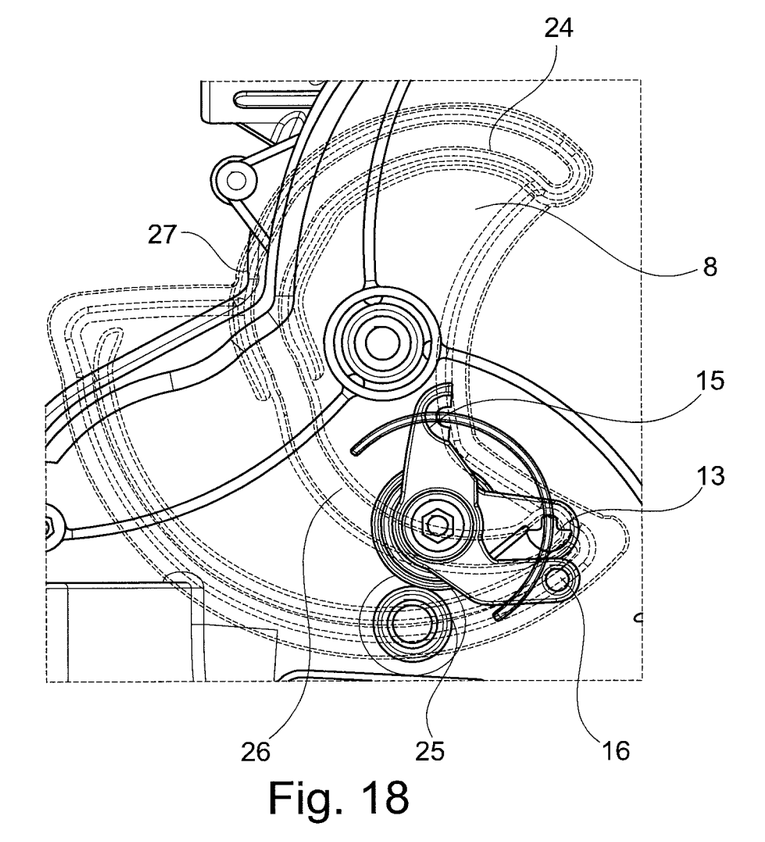
FIG. 18 shows an arrangement of the cam plate and the pins and levers according to FIG. 15.

The FIG. 18 shows the cam plate 8 in a position related to the position of the dampers 2, 3 according to FIG. 15. Only pin 13 is located within groove 24 and in the top level tier 26 and pin 16 is located inside groove 25. Pin 15 is located outside of groove 24 and bottom level tier 27.

Figure 19:
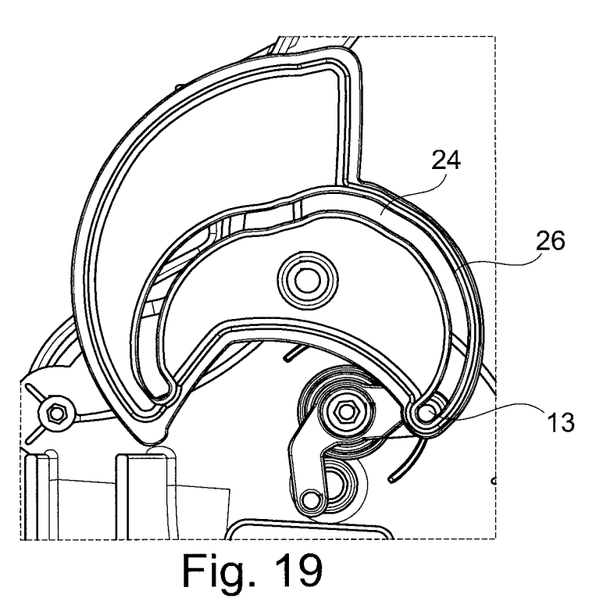
FIG. 19 shows an arrangement of the cam plate and a pin according to FIGS. 13 and 16.
Figure 20:
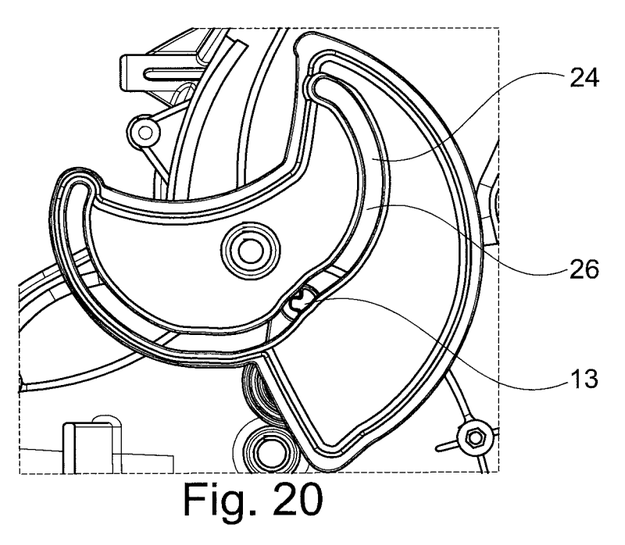
FIG. 20 shows an arrangement of the cam plate and a pin according to FIGS. 14 and 17.
Figure 21:
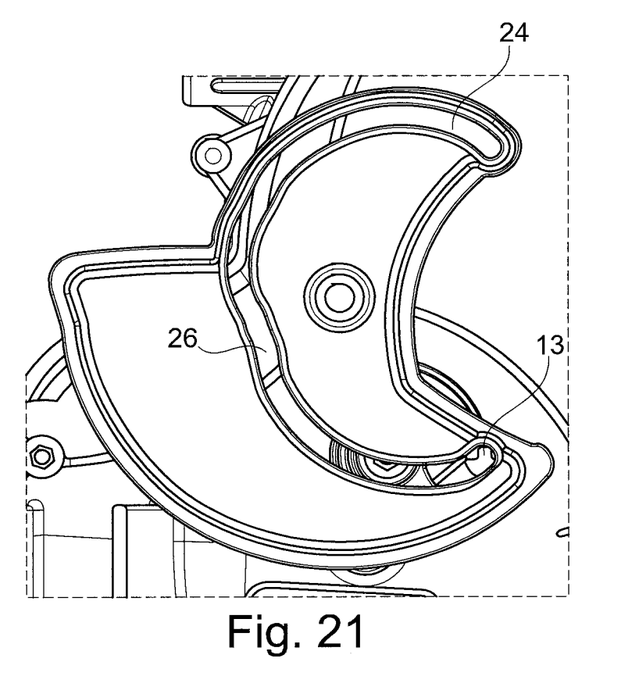
FIG. 21 shows an arrangement of the cam plate and a pin according to FIGS. 15 and 18.

The FIGS. 19 to 21 show the position of the pin 13 in groove 24 in the top level tier 26. The configuration of FIG. 19 is related to the configuration of FIGS. 13 and 16. The configuration of FIG. 20 is related to the configuration of FIGS. 14 and 17. The configuration of FIG. 21 is related to the configuration of FIGS. 15 and 18. The pin 13 moves from the beginning of groove 24 until the end of groove 24, as can be seen from FIGS. 19 to 21.

Figure 22:
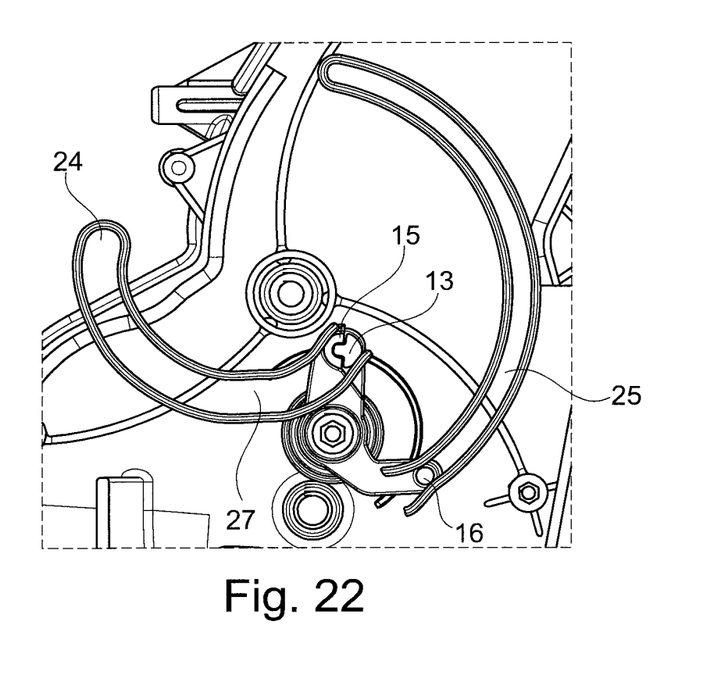
FIG. 22 shows an arrangement of the grooves of the cam plate and pins and levers according to FIGS. 20, 14 and 17.
Figure 23:
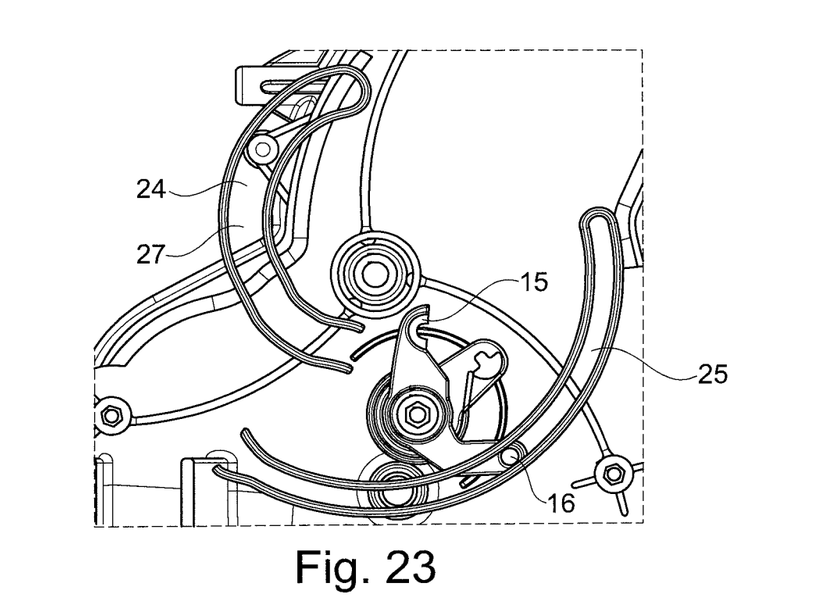
FIG. 23 shows an arrangement of the grooves of the cam plate and pins and levers according to a position between the positions of FIGS. 22 and 24.
Figure 24:
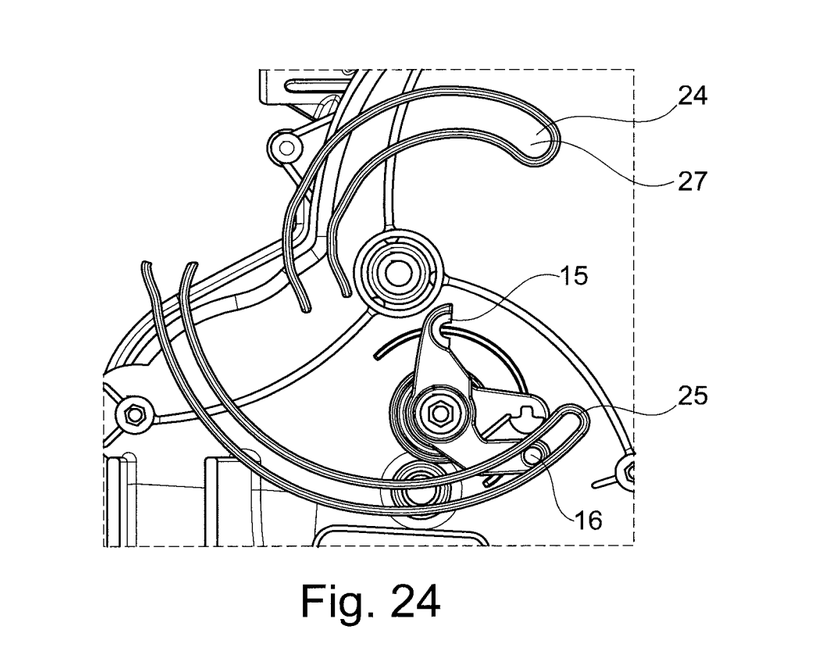
FIG. 24 shows an arrangement of the grooves of the cam plate and pins and levers according to FIGS. 21, 15 and 18.

The FIGS. 22 to 24 show the position of the pins 15 and 16 in grooves 24 and 25 in the bottom level tier 27. The configuration of FIG. 22 is related to the configuration of FIGS. 14 and 17, the configuration of FIG. 24 is related to the configuration of FIGS. 15 and 18, and the configuration of FIG. 23 is related to a configuration between these two configurations of FIGS. 22 and 24.

In FIG. 22 the pin 15 moves out of groove 24 and bottom level tier 27 while pin 16 moves inside the groove 25 from outside of the groove 25. In FIG. 23 the pin 15 is already outside of groove 24 and bottom level tier 27 while pin 16 is located in a middle position of the extension of groove 25. In FIG. 24 the pin 15 is still outside of groove 24 and bottom level tier 27 while pin 16 is located almost at an end position of groove 25.

Therefore the inventive concept discloses a method of controlling an air mixing damper arrangement 1 with a first cooled air damper 2 and a second heated air damper 3, wherein the first damper 2 has a first shaft 4 having a first center of rotation 5 and the second damper 3 hast a second shaft 6 having a second center of rotation 7, wherein the first center of rotation 5 and the second center of rotation 6 are identical, wherein the first damper 2 and the second damper 3 are individually rotatable about the respective center of rotation 5,7, wherein the first damper 2 and the second damper 3 are both actuated by a cam plate 8, the first damper 2 has a lever 12 having a pin 13 having a top level shape 19 and a bottom level shape 20, the second damper 3 has a lever 12 having a first pin 15 and a second pin 16, wherein the first pin 15 has a shape cooperating with the second level pin 16 of the first damper 2, wherein the cam plate 8 has a first groove 24 having a first top level tier 26 and having a second bottom level tier 27 and the cam plate 8 having a second groove 25 with one tier 28, the arrangement of the damper 2,3 is such that the top level shape 19 of the pin 13 of the first damper 2 is movable in the top level tier 26 of the first groove 24, the bottom level shape 20 of the pin 13 of the first damper 2 is movable in the bottom level tier 27 of the first groove 24, the first pin 15 of the second damper 3 is movable in the bottom level tier 27 of the first groove 24 and the second pin 16 of the second damper 3 is movable in the second groove 25, such that in a first angular range of rotation of the cam plate 8 both the first damper 2 and the second damper 3 are actuated and in a second angular range of rotation of the cam plate 8 only the first damper 2 is actuated while the second damper 3 is at least almost at rest.

Therefore the method comprises in one embodiment that the top level tier 26 of the first groove 24 extends through the full actuation angle of the cam plate 8 of both the first angular range and the second angular range of rotation of the cam plate 8 such that the top level shape 19 of the first pin 15 of the first damper 2 is always located within the top level tier 26 of the first groove 24.

Therefore the method comprises in an embodiment that the bottom level tier 27 of the first groove 24 extends only partly through the full actuation angle of the cam plate 8 and through the first angular range of rotation of the cam plate 8 such that the bottom level shape 20 of the first pin 15 of the first damper 2 is only partly located within the bottom level tier 27 of the first groove 24 through the first angular range of rotation of the cam plate 8 and partly located out of the bottom level tier 27 of the first groove with respect to the actuation angle of the cam plate 8 and through the second angular range of rotation of the cam plate 8.

Therefore the method comprises in an embodiment that the bottom level tier 27 of the first groove 24 extends only partly through the full actuation angle of the cam plate 8 and through the first angular range of rotation of the cam plate 8 such that the bottom level shape 20 of the first pin 15 of the second damper 3 is only partly located within the bottom level tier 27 of the first groove 24 through the first angular range of rotation of the cam plate 8 and partly located out of the bottom level tier 27 of the first groove 24 with respect to the actuation angle of the cam plate 8 through the second angular range of rotation of the cam plate 8.

Therefore the method comprises in an embodiment that the second groove 25 extends only partly through the full actuation angle of the cam plate 8 through the second angular range of the cam plate 8 such that the second pin 16 of the second damper 3 is only partly located within the second groove 25 through the second angular range of the cam plate 8 and partly located out of the second groove 25 with respect to the actuation angle of the cam plate 8 through the first angular range of the cam plate 8.

Therefore the method comprises in an embodiment that the first pin 15 of the second damper 3 undergoes a transition from a movement of the first pin 15 within the first groove 24 to a movement outside of the first groove 24 or from a movement of the first pin 15 outside of the first groove 24 to within the first groove 24 and the second pin 16 of the second damper 3 undergoes a transition from a movement of the second pin 16 outside of the second groove 25 to within the second groove 25 and from a movement of the second pin 16 within the second groove 25 to a movement outside of the second groove 25, wherein the transitions for the first pin 15 and the second pin 16 happens at almost the same actuation angle of the cam plate 8 at the transition from the first angular range of the cam plate 8 to the second angular range of the cam plate 8.

Therefore the method comprises in an embodiment that the transition of a pin 13 out of a groove 24, 25 happens after the transition of the other pin 13,15 and 16 inside the groove 24, 25 is already terminated, such that the first groove 24 and the second groove 25 are both developed at an actuation angle of the cam plate 8 at which the transitions are taking place.

Therefore the method comprises in an embodiment that an actuator 9 is provided actuating the cam plate 8 through the first angular range of rotation and the second angular range of rotation.

Therefore the method comprises in an embodiment that the actuator 9 rotates the cam plate 8 such that the pins 13,15 and 16 in the grooves 24, 25 actuate the first damper 2 and/or the second damper 3.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An air mixing damper arrangement comprising:
   a first cooled air damper damping cooled air in a cooled air flow path; and
   a second heated air damper damping heated air in a heated air flow path,
   wherein the first damper has a first shaft having a first center of rotation and the second damper has a second shaft having a second center of rotation,
   wherein the first center of rotation and the second center of rotation are identically aligned,
   wherein the first damper and the second damper are individually rotatable about their respective center of rotation,
   wherein the first damper and the second damper are both actuated by a cam plate, the first damper has a lever having a pin having a top level shape and a bottom level shape, the second damper has a lever having a first pin and a second pin,
   wherein the first pin of the second damper has a shape cooperating with the bottom level shape of the pin of the first damper,
   wherein the cam plate has a first groove having a first top level tier and having a second bottom level tier and the cam plate having a second groove with one tier,
   wherein an arrangement of the damper is such that the top level shape of the pin of the first damper is movable in the top level tier of the first groove, the bottom level shape of the pin of the first damper is movable in the bottom level tier of the first groove, the first pin of the second damper is movable in the bottom level tier of the first groove and the second pin of the second damper is movable in the second groove,
   wherein the top level tier of the first groove extends through the full actuation angle of the cam plate such that the top level shape of the pin of the first damper is always located within the top level tier of the first groove,
   wherein the bottom level tier of the first groove extends only partly through the full actuation angle of the cam plate such that the bottom level shape of the pin of the first damper is only partly located within the bottom level tier of the first groove and partly located out of the bottom level tier of the first groove with respect to the actuation angle of the cam plate,
   wherein the bottom level tier of the first groove extends only partly through the full actuation angle of the cam plate such that the first pin of the second damper is only partly located within the bottom level tier of the first groove and partly located out of the bottom level tier of the first groove with respect to the actuation angle of the cam plate,
   wherein the second groove extends only partly through the full actuation angle of the cam plate such that the second pin of the second damper is only partly located within the second groove and partly located out of the second groove with respect to the actuation angle of the cam plate, and
   wherein the first pin of the second damper undergoes a transition from a movement of the first pin within the first groove to a movement outside of the first groove or from a movement of the first pin outside of the first groove to a movement within the first groove and the second pin of the second damper undergoes a transition from a movement of the second pin outside of the second groove to a movement within the second groove and from a movement of the second pin within the second groove to a movement outside of the second groove, wherein the transitions for the first pin and the second pin happens at almost the same actuation angle of the cam plate.

2. The air mixing damper arrangement according to claim 1, wherein the transition of the first pin out of the first groove or the transition of the second pin out of the second groove happens after the transition of the other of the first pin inside the first groove or the transition of the second pin inside the second groove is already terminated, such that the first groove and the second groove are both developed at an actuation angle of the cam plate at which the transitions are taking place.

3. The air mixing damper arrangement according to claim 2, wherein an actuator is provided which actuates the cam plate.

4. The air mixing damper arrangement according to claim 3, wherein the actuator rotates the cam plate such that the pin of the first damper and the first pin and the second pin of the second damper in the respective first or second groove actuate the first damper and/or the second damper.

5. An air-conditioning unit having an air mixing damper arrangement according to claim 1.

6. A method of controlling an air mixing damper arrangement, the method comprising:
provi­ding a first cooled air damper and a second heated air damper, the first damper having a first shaft having a first center of rotation and the second damper having a second shaft having a second center of rotation, the first center of rotation and the second center of rotation being identical, the first damper and the second damper being individually rotatable about a respective center of rotation,
actuating the first damper and the second damper by a cam plate, the first damper having a lever having a pin having a top level shape and a bottom level shape, the second damper having a lever having a first pin and a second pin, the first pin having a shape cooperating with the bottom level shape of the first damper,
wherein the cam plate has a first groove having a first top level tier and having a second bottom level tier,
wherein the cam has a second groove with one tier,
wherein an arrangement of the damper is such that the top level shape of the pin of the first damper is movable in the top level tier of the first groove, the bottom level shape of the pin of the first damper is movable in the bottom level tier of the first groove, the first pin of the second damper is movable in the bottom level tier of the first groove and the second pin of the second damper is movable in the second groove such that in a first angular range of rotation of the cam plate both the first damper and the second damper are actuated and in a second angular range of rotation of the cam plate only the first damper is actuated while the second damper is at least almost at rest,
wherein the top level tier of the first groove extends through the full actuation angle of the cam plate of both the first angular range and the second angular range of rotation of the cam plate such that the top level shape of the pin of the first damper is always located within the top level tier of the first groove,
wherein the bottom level tier of the first groove extends only partly through the full actuation angle of the cam plate and through the first angular range of rotation of the cam plate such that the bottom level shape of the pin of the first damper is only partly located within the bottom level tier of the first groove through the first angular range of rotation of the cam plate and partly located out of the bottom level tier of the first groove with respect to the actuation angle of the cam plate and through the second angular range of rotation of the cam plate,
wherein the bottom level tier of the first groove extends only partly through the full actuation angle of the cam plate and through the first angular range of rotation of the cam plate such that the first pin of the second damper is only partly located within the bottom level tier of the first groove through the first angular range of rotation of the cam plate and partly located out of the bottom level tier of the first groove with respect to the actuation angle of the cam plate through the second angular range of rotation of the cam plate,
wherein the second groove extends only partly through the full actuation angle of the cam plate through the second angular range of the cam plate such that the second pin of the second damper is only partly located within the second groove through the second angular range of the cam plate and partly located out of the second groove with respect to the actuation angle of the cam plate through the first angular range of the cam plate, and
wherein the first pin of the second damper undergoes a transition from a movement of the first pin within the first groove to a movement outside of the first groove or from a movement of the first pin outside of the first groove to within the first groove and the second pin of the second damper undergoes a transition from a movement of the second pin outside of the second groove to within the second groove and from a movement of the second pin within the second groove to a movement outside of the second groove, wherein the transitions for the first pin and the second pin happens at almost the same actuation angle of the cam plate at the transition from the first angular range of the cam plate to the second angular range of the cam plate.

7. The method according to claim 6, wherein the transition of the first pin out of the first groove or the transition of the second pin out of the second groove happens after the transition of the other of the first pin inside the first groove or the transition of the second pin inside the second groove is already terminated, such that the first groove and the second groove are both developed at an actuation angle of the cam plate at which the transitions are taking place.

8. The method according to claim 7, wherein an actuator is provided actuating the cam plate through the first angular range of rotation and the second angular range of rotation.

9. The method according to claim 8, wherein the actuator rotates the cam plate such that the pin of the first damper and the first pin and the second pin of the second damper in the respective first or second groove actuate the first damper and/or the second damper.

\* \* \* \* \*

UNITED STATES PATENT AND TRADEMARK OFFICE
CERTIFICATE OF CORRECTION

PATENT NO. : 10,654,338 B2  
APPLICATION NO. : 15/816370  
DATED : May 19, 2020  
INVENTOR(S) : Sokolofsky et al.

Page 1 of 1

It is certified that error appears in the above-identified patent and that said Letters Patent is hereby corrected as shown below:

On the Title Page

(72) Inventors shows:  
Phillip Sokolofsky, Akron, NY (US);  
Martin Stucko, Elba, NY (US); Steve M. Zielinski, North Tonowanda, NY (US)

(72) Inventors should show:  
Phillip Sokolofsky, Akron, NY (US);  
Martin Stucko, Elba, NY (US); Steve M. Zielinski, North Tonawanda, NY (US)

Signed and Sealed this  
Fourteenth Day of July, 2020

Andrei Iancu  
*Director of the United States Patent and Trademark Office*